(12) United States Patent
Wu et al.

(10) Patent No.: US 7,014,486 B1
(45) Date of Patent: Mar. 21, 2006

(54) RECOVERABLE CONNECTOR STRUCTURE AND CRADLE HAVING THE SAME

(75) Inventors: Chin-Lung Wu, Tao Yuan (TW); Fu-Chung Hsieh, Tao Yuan (TW)

(73) Assignee: High Tech Computer, Corp., Tao Yuan (TW)

( * ) Notice: Subject to any disclaimer, the term of this patent is extended or adjusted under 35 U.S.C. 154(b) by 0 days.

(21) Appl. No.: 11/134,745

(22) Filed: May 19, 2005

(30) Foreign Application Priority Data

Dec. 7, 2004 (TW) ............................. 93219672 U (51) Int. Cl.
*H01R 13/64* (2006.01)
(52) U.S. Cl. ...................... 439/248; 439/534; 439/929; 439/165; 439/341
(58) Field of Classification Search ............... 439/535, 439/534, 929, 31, 165, 446, 248, 164, 135, 439/137, 554, 557, 558, 500, 502, 246, 341; 361/686, 683
See application file for complete search history.

(56) References Cited

U.S. PATENT DOCUMENTS

| | | | | |
|---|---|---|---|---|
| 5,078,615 A | * | 1/1992 | Benson et al. ............... | 439/246 |
| 6,113,409 A | * | 9/2000 | Park ........................... | 439/310 |
| 6,193,546 B1 | * | 2/2001 | Sadler ........................ | 439/534 |
| 6,290,534 B1 | * | 9/2001 | Sadler ........................ | 439/534 |
| 6,549,416 B1 | * | 4/2003 | Sterner et al. .............. | 361/727 |
| 6,716,058 B1 | | 4/2004 | Youn .......................... | 439/535 |
| 2004/0203267 A1 | * | 10/2004 | Chen et al. ................ | 439/76.1 |

* cited by examiner

*Primary Examiner*—Gary F. Paumen
*Assistant Examiner*—Edwin A. Leon
(74) *Attorney, Agent, or Firm*—J.C. Patents (57) ABSTRACT

A recoverable connector structure and a cradle having the same are provided. The cradle includes a base plate, a fixed stand, a recoverable assembly having a bolt and an elastic body, a support body, a shielding plate, a circuit board, a second connector and a case. An electronic device couples with the second connector of the cradle through a first connector of the electronic device. When the electronic device is pulled from the second connector of the cradle, the recoverable assembly allows the second connector and the circuit board to rotate in a certain angle. As the electronic device is separated from the cradle, the second connector can return to its initial position. This design not only makes the process of pulling up the electronic device smooth, but also avoids the second connector from fatigued damage to extend the cradle's life.

28 Claims, 5 Drawing Sheets

RECOVERABLE CONNECTOR STRUCTURE AND CRADLE HAVING THE SAME

CROSS-REFERENCE TO RELATED APPLICATION

This application claims the priority benefit of Taiwan application serial no. 93219672, filed on Dec. 7, 2004. All disclosure of the Taiwan application is incorporated herein by reference.

BACKGROUND OF THE INVENTION

1. Field of the Invention

The present invention relates to a recoverable connector structure, and more particularly, to a recoverable connector structure and a cradle having the same for charging an electronic device or transmitting data from/to the electronic device.

2. Description of the Related Art

The electronic devices, such as PDA (Personal Digital Assistant), generally include a plurality of connectors for supporting various functions, such as the power I/O connector and the pluggable card connector. For the power I/O connector, it is generally designed as at the bottom of PDA, and when the PDA is charged, one terminal (a female connector) of the power I/O connector in the PDA is plugged onto one terminal (a male connector) of the power I/O connector in the cradle. In addition, a USB cable assembly is coupled with the power I/O connector of the cradle for connecting to a computer host. Accordingly, the PDA can exchange data (such as calendar update) with the computer host through the USB cable assembly and the power I/O connector of the cradle.

Figure 1:
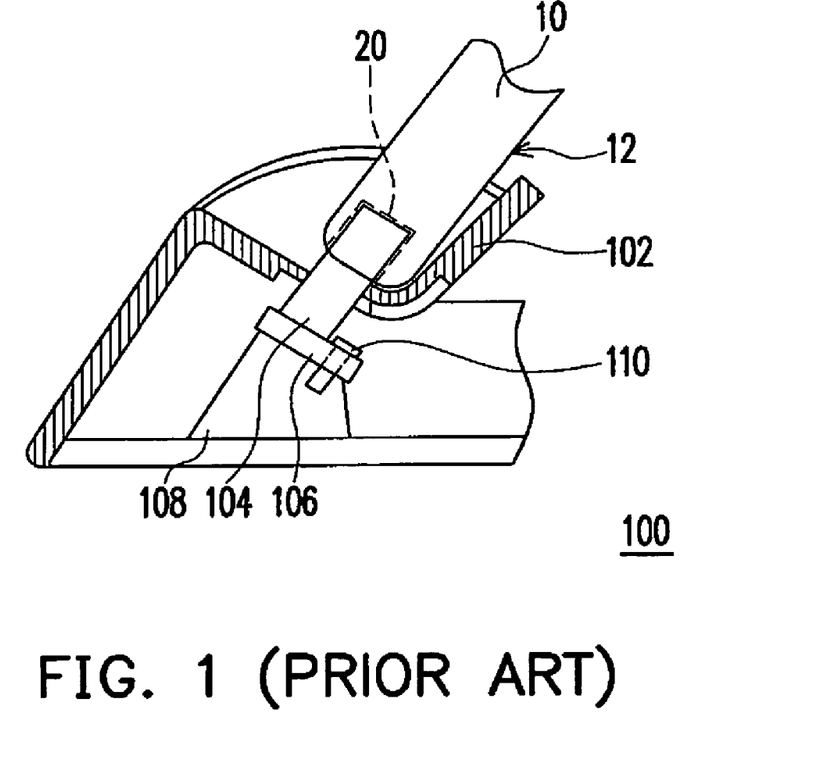
FIG. 1 schematically shows a conventional fixed connector structure and a cradle.

FIG. 1 schematically shows a fixed structure of a conventional connector. A cradle 100 is generally used, such that a first connector 20 (the female connector) at the bottom of the PDA 10 can be firmly plugged into a second connector 104 (the male connector). Wherein, the cradle 100 mainly comprises a case having a groove 102, a second connector 104, a circuit board 106, and a base plate 108. The groove 102 holds the bottom of the PDA 10, and the front end of the second connector 104 protrudes from the groove 102 and is firmly connected with the first connector 20 at the bottom of the PDA 10. In addition, the circuit board 106 is fixed on the base plate 108 with the screw 110 when it is assembled. To be noted, when the PDA 10 is disposed in the groove 102, the back panel 12 of the PDA 10 is placed on the inner wall of the groove 102 with a slant angle. In addition, the second connector 104 is vertically fixed on the circuit board 106, and protrudes from the groove 102 with the same slant angle.

However, when the connector end (such as the bottom end) of the PDA 10 is plugged into the case groove 102, the second connector 104 is fixed on the cradle 100 by a fixed structure (including the circuit board 106, the base plate 108, and the screw 110), such that the first connector 20 connecting to the PDA 10 would not be shaken. But an alignment stress can occur between two connectors 20 and 104 due to alignment tolerance of the fixed structure, especially when the PDA 10 had been plugged in and out from the second connector 104 of the cradle 100 for multiple times, thus a solder connection between the circuit board 106 and the second connector 104 of the cradle 100 is easily broken, leading to poor contact. In addition, regarding the stress buffering effect, since the fixed structure of the second connector 104 cannot buffer the external force, if there is inappropriate external force (or bending force) applied on the second connector 104 of the cradle 100, the solder connection between the second connector 104 and the circuit board 106 can be easily broken, leading to poor contact and deteriorating the reliability of the second connector 104. In addition, when pulling out the electronic device from the cradle, the process is not very smooth for the conventional technique. Moreover, if the user does not plug in and pull out the PDA 10 carefully with the right angle, the applied force would generate a bending stress on the solder connection between the connector and the circuit board. When the stress exceeds a certain level, the solder connection would break and the cradle can no longer function.

SUMMARY OF THE INVENTION

Therefore, it is an object of the present invention to provide a recoverable connector structure for placing in a cradle of an electronic device (such as PDA). This design makes the process of pulling up the electronic device smooth, and avoids the connector of the cradle from fatigued damage.

It is another object of the present invention to provide a cradle having a recoverable connector structure for electrically coupling to an electronic device (such as PDA). This design not only makes the process of pulling up the electronic device smooth, but also avoids the connector from fatigued damage due to frequent plugging and unplugging operations to extend the cradle's life.

In order to achieve the objects mentioned above, the present invention provides a recoverable connector structure for placing in a cradle of an electronic device (such as PDA). Wherein, the electronic device comprises a first connector. The cradle comprises a second connector and a circuit board, such that the second connector is electrically coupled to the first connector. The circuit board comprises a surface and two holes. The recoverable connector structure of the present invention mainly comprises a base plate, a fixed stand, a recoverable assembly, a support body, and a shielding plate. Wherein, the fixed stand is disposed on the base plate, and the fixed stand has two lock holes, corresponding to the two holes, respectively. In addition, the recoverable assembly at least comprises a bolt and an elastic body, and the bolt comprises a first end and a second end. The first end passing through one of the holes on the circuit board is fixed on one of the corresponding lock holes. The elastic body is disposed between the circuit board and the second end of the bolt, such that the elastic body is pushed toward the second end for a certain distance when an external force is applied on the circuit board. In addition, the support body is disposed on the circuit board, and contacts the bottom of the circuit board, such that a block plate is formed on the surface of the base plate. Moreover, when an external force is applied on the second connector, the second connector rotates with the bottom of the support body and the circuit board serving as a pivot point.

In the recoverable connector structure according to an embodiment of the present invention, the second connector mentioned above is formed as an integrative unit above the support body. The shielding plate covering the support body and the second connector is soldered on the circuit board. Wherein, the shielding plate is for example an anti-EMW (electromagnetic wave) interference metal plate.

In the recoverable connector structure according to the embodiment of the present invention, the base plate mentioned above has three blocks, and the bottom of the support body has two corresponding contact faces, which contacts the first block and the second block respectively for forming the pivot point mentioned above. In addition, the support body is shaped like U, and two surfaces on the opening end of the U body are the two contact faces mentioned above. The bottom of the circuit board contacts the third block for forming the pivot point mentioned above, and the third block is disposed between the first block and the second block.

In the recoverable connector structure according to the embodiment of the present invention, the bolt mentioned above is for example a screw with a fixed length, the first end of the bolt is a spiral structure, and the second end of the bolt is a protrusion end. Moreover, the elastic body is for example a spiral spring.

In the recoverable connector structure according to the embodiment of the present invention, the second connector mentioned above can deliver external electricity to the electronic device, or transmit an external signal to the electronic device.

In order to achieve another object mentioned above, the present invention provides a cradle having a recoverable connector structure for electrically coupling to an electronic device, which has a first connector. The cradle mainly comprises a case, a base plate, a fixed stand, a circuit board, a recoverable assembly, a second connector, a support body, and a shielding plate. Wherein, the case has a groove where the electronic device is plugged into, and the base plate is connected to the bottom of the case. In addition, the fixed stand is disposed on the base plate, and the fixed stand has two lock holes. Moreover, the circuit board having a surface and two holes is recoverably disposed on the fixed stand, and each hole of the circuit board corresponds to the location of each lock hole of the fixed stand, respectively. The recoverable assembly at least comprises a bolt and an elastic body. Wherein, the bolt has a first end and a second end, and the first end passing through one of the holes on the circuit board is fixed on one of the corresponding lock holes. The elastic body is disposed between the circuit board and the second end of the bolt, such that the elastic body is pushed toward the second end for a certain distance when an external force is applied on the circuit board. In addition, the second connector is electrically coupled to the circuit board and protrudes from the case groove. The support body is disposed on the circuit board, and the second connector is formed as an integrative unit above the support body. In addition, the support body contacts the bottom of the circuit board, such that a block is formed on the base plate. Moreover, when an external force is applied on the second connector, the second connector rotates with the bottom of the support body and the circuit board serving as a pivot point.

In the cradle having the recoverable connector structure according to the embodiment of the present invention, the shielding plate covering the support body and the second connector is soldered on the circuit board. Wherein, the shielding plate is, for example, an anti-EMW interference metal plate.

In the cradle having the recoverable connector structure according to the embodiment of the present invention, the base plate mentioned above has three blocks, and the bottom of the support body has two corresponding contact faces, which contacts the first block and the second block respectively for forming the pivot point mentioned above. In addition, the support body is shaped like U, and two surfaces on the opening end of the U body are the two contact faces mentioned above. The bottom of the circuit board contacts the third block for forming the pivot point mentioned above, and the third block is disposed between the first block and the second block.

In the cradle having the recoverable connector structure according to the embodiment of the present invention, the bolt mentioned above is, for example, a screw with fixed length, the first end of the bolt is a spiral structure, and the second end of the bolt is a protrusion end. Moreover, the elastic body in the recoverable assembly is, for example, a spiral spring.

Since the recoverable connector structure is utilized in the present invention, when the user pulls up the electronic device, the recoverable assembly allows the second connector and the circuit board to rotate along with the electronic device with a maximum angle. As the electronic device is separated from the cradle, the second connector and the circuit board return to its initial position due to the elasticity of the recoverable assembly. With the elasticity of the recoverable structure, this design not only makes the process of pulling up the electronic device smooth, but also avoids the second connector from fatigued damage.

BRIEF DESCRIPTION OF THE DRAWINGS

The accompanying drawings are included to provide a further understanding of the invention, and are incorporated in and constitute a part of this specification. The drawings illustrate embodiments of the invention, and together with the description, serve to explain the principles of the invention.

DESCRIPTION OF THE EMBODIMENTS

Figure 2A:
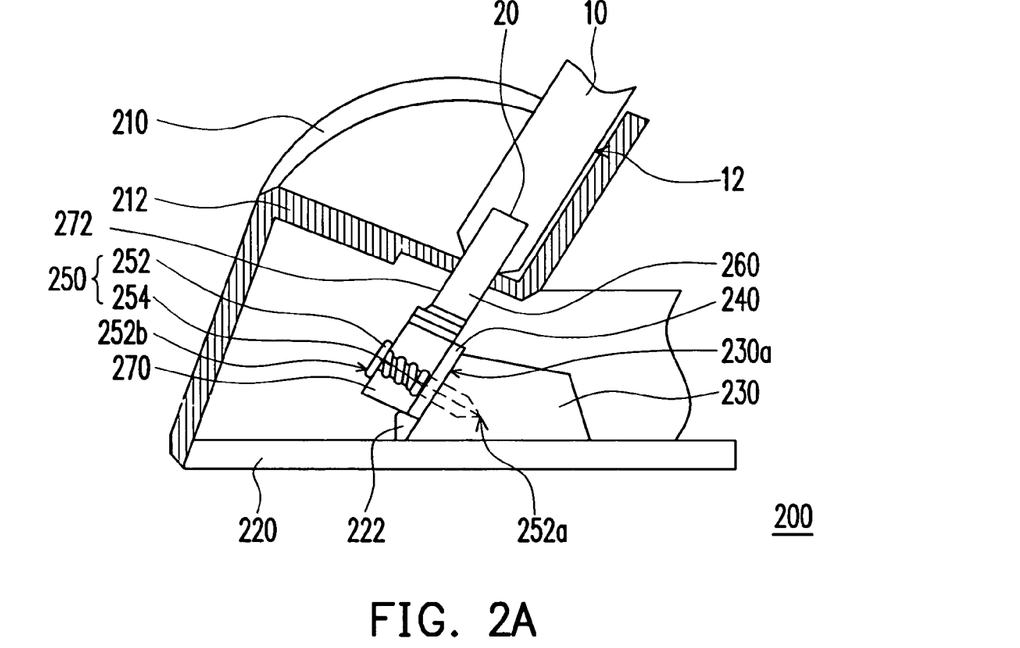
FIG. 2A schematically shows a recoverable connector structure and a cradle according to an embodiment of the present invention.

FIG. 2A is a representative diagram of the present invention, which schematically shows a recoverable connector structure and a cradle 200 according to an embodiment of the present invention. Here, the cradle 200 is used in the electronic device such as the PDA 10 for delivering power or transmitting data. The PDA 10 has a first connector 20 (a female connector) that is connected to the corresponding second connector 260 (a male connector) of the cradle 200. In addition, a back panel 12 of the PDA 10 leans on the internal wall of the cradle 200, so as to deliver power or transmit data or deliver power and transmit data simultaneously. Although the PDA 10 is exemplified, the present invention is not limited thereto, and other device such as the mobile phone with PDA function, the smart phone, or other portable electronic devices with functions similar to PDA, are also suitable for the recoverable connector structure and the cradle 200 of the present invention.

Figure 3:
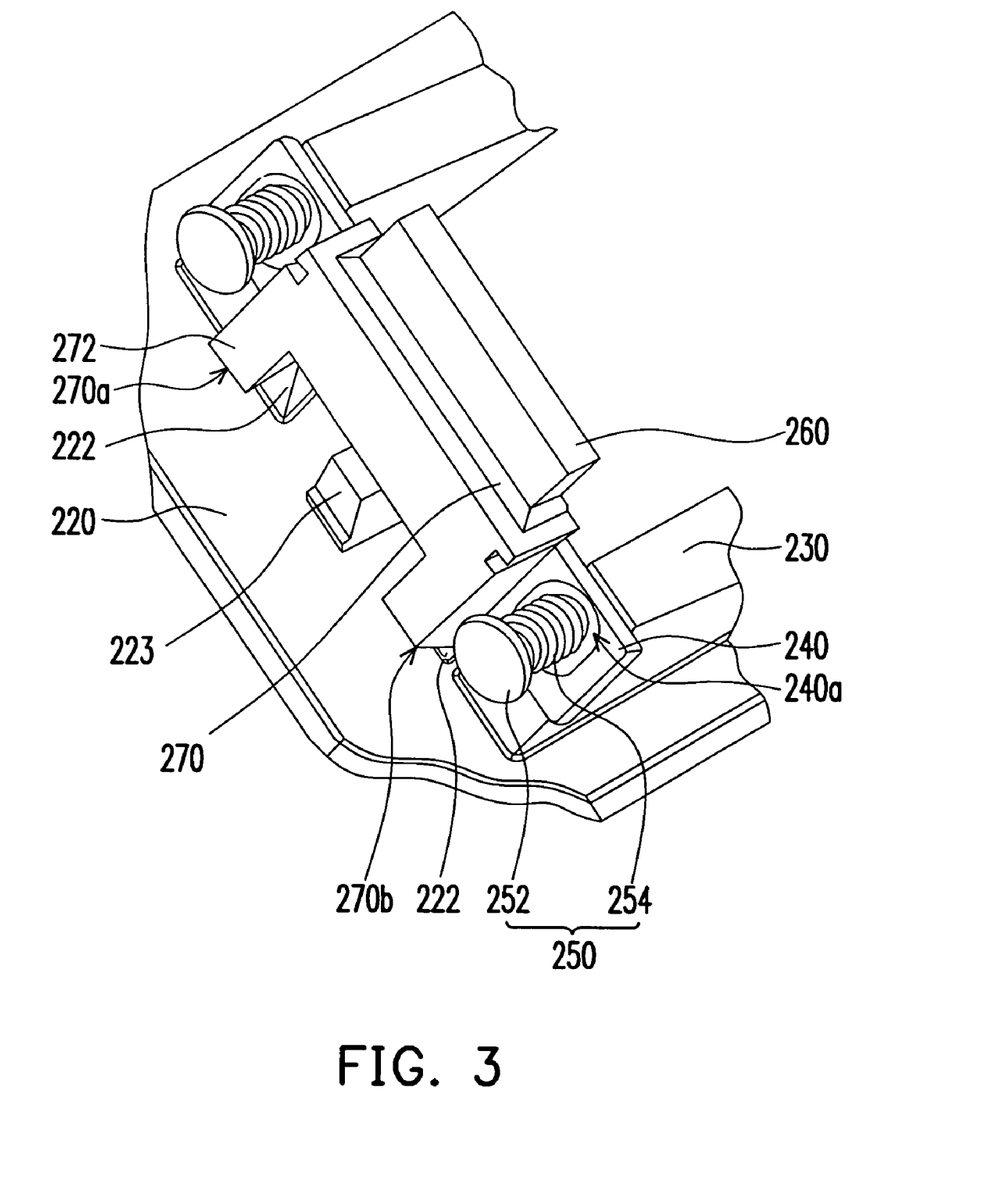
FIG. 3 schematically shows a partial 3D magnified diagram of a recoverable connector structure and a cradle according to an embodiment of the present invention.

Please refer to both FIG. 2A and FIG. 3. FIG. 3 schematically shows a 3D diagram of a recoverable connector structure according to an embodiment of the present invention. The recoverable connector structure and the cradle 200 mainly comprises a case 210, a base plate 220, a fixed stand 230, a circuit board 240, a recoverable assembly 250, a second connector 260, a support body 270, and a shielding plate 272. Wherein, the case 210 has a groove 212 where the PDA 10 is plugged into, and the second connector 260 protrudes from the groove 212 and is coupled to the first connector 20 of the PDA 10 for delivering power or transmitting signal. The recoverable connector structure of the present invention is covered by the case 210, and the bottom of the case 210 is connected to the base plate 220 for forming the cradle 200. In addition, the circuit board 240 also has a flat cable (not shown) for electrically coupling to other circuit in the cradle 200.

The base plate 220 and the fixed stand 230 are formed as an integrative unit by mold materials. The fixed stand 230 disposed on the base plate 220 has a slant surface 230a and two lock holes (not shown) on the slant surface 230a, such that the circuit board 240 can lean on the slant surface 230a at a slant angle. In addition, there are two oval holes on two sides of the circuit board 240, such that the bolt 252 of the recoverable assembly 250 can smoothly pass through the hole 240a to be locked on the fixed stand 230.

Figure 2B:
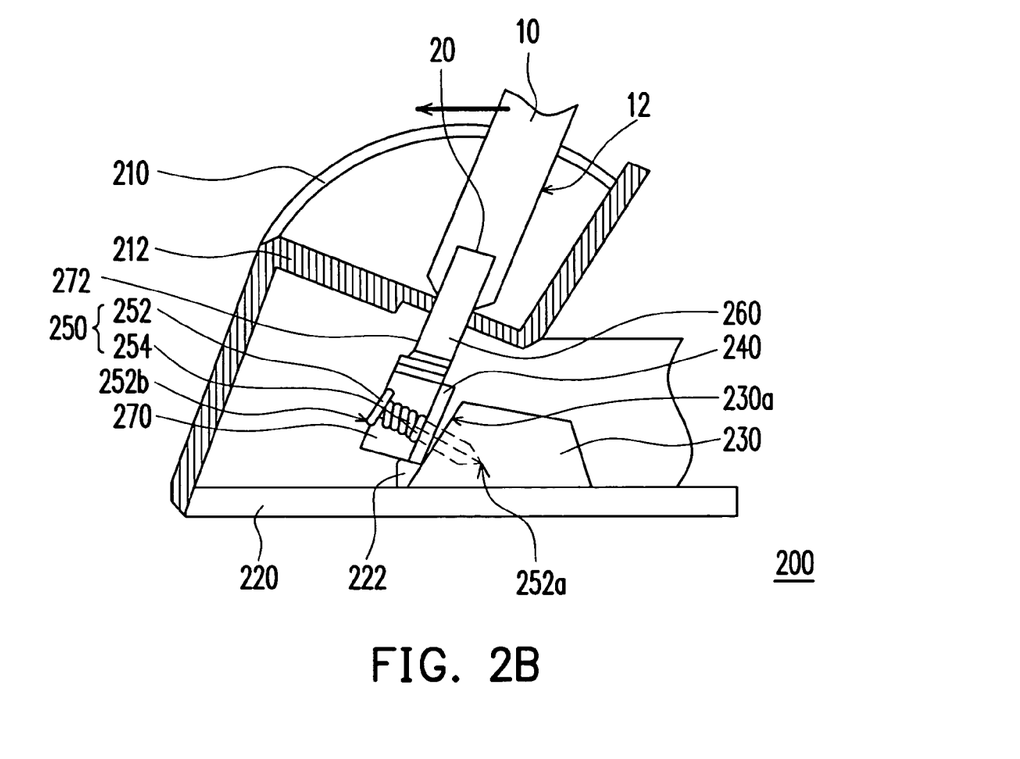
FIG. 2B shows a recoverable connector structure being pushed when the PDA 10 is pulled up from the cradle 200 according to the embodiment of the present invention.

Moreover, a bolt 252 and an elastic body 254 are further configured in the recoverable assembly 250 on each side of the circuit board 240. The bolt 252 is for example a screw with fixed length having a first end 252a and a second end 252b. The first end 252a is a spiral structure, which passes through the hole 240a on the circuit board 240 and is locked on the corresponding lock hole (not shown) of the fixed stand 230, so as to be fastened to the fixed stand 230. In addition, the second end 252b of the bolt 252 is a protrusion end, shaped like a round plate, which works as a fixed support end for supporting the elastic body 254 when pushed. The elastic body 254 is for example a spiral spring disposed between the circuit board 240 and the second end 252b of the bolt 252. The first function of the elastic body 254 is to push the circuit board 240 toward the fixed stand 230 as shown in FIG. 2A. The second function is to provide a compression space for circuit board 240 and the second connector 260 to freely rotate as shown in FIG. 2B when the circuit board 240 and the second connector 260 rotate due to the external tracking force.

The bottom of the support body 270 mentioned above contacts the surface of the first and second blocks 222 of the base plate 220 (referring to FIG. 3 and FIG. 2A), and the bottom of the support body 270 works as a pivot point for supporting the second connector 260 and the circuit board 240 as they rotate when pushed by an external force, and the impact force generated when the PDA 10 is plugged into the second connector 260 can be absorbed. In the present embodiment, the support body 270 is for example shaped like U, covering the circuit board 240. In addition, two surfaces 270a and 270b disposed on the opening end of the U-shaped body correspondingly contact the first and second blocks 222 of the base plate 220 respectively, serving as a rotation support surface. Although the U-shaped shielding plate 270 is exemplified, the present invention is not necessarily limited to using the U-shaped body as its support body in the recoverable connector structure of the present invention. For example, an arch structure can be used to support the circuit board 240 and the second connector 260. The bottom edge of the circuit board 240 leans on the third block 223 formed on the base plate 220, and serves as a support surface to support the second connector 260 and the circuit board 240 when they are rotating. Wherein, the third block 223 is disposed between the first and the second blocks 222.

As described above, the shielding plate 272, which serves as an anti-EMW interference component, is made of metal or other EMW absorbable material, for example, such that the second connector 260 and the circuit board 240 can correctly deliver electricity or transmit data without interference by other signal and noise. Moreover, the shielding plate 272 covering the second connector 260 and the support body 270 is soldered on the circuit board 240.

The major function of the recoverable connector structure and cradle 200 described in the present invention is to provide an elastic range for the second connector 260 and the circuit board 240 to rotate when pushed by an external force. FIG. 2B is a diagram illustrating the PDA 10 being pulled up from the cradle 200. The present invention allows the second connector 260 and the circuit board 240 to rotate toward the second end 252b of the bolt 252 at a maximum angle (for example, to rotate within a range of 1015 degrees) using the elastic characteristic of the elastic body 254 between the second end 252b of the bolt 252 and the circuit board 240. Meanwhile, the support body the rotation. When the PDA 10 is fully separated from the cradle 200, the second connector 260 and the circuit board 240 are back to its original position due to the elasticity of the recoverable assembly 250. Accordingly, the present invention not only enables a user to pull up the electronic device more smoothly, but also avoids the second connector 260 from fatigued damage to extend the cradle's life.

Figure 4A:
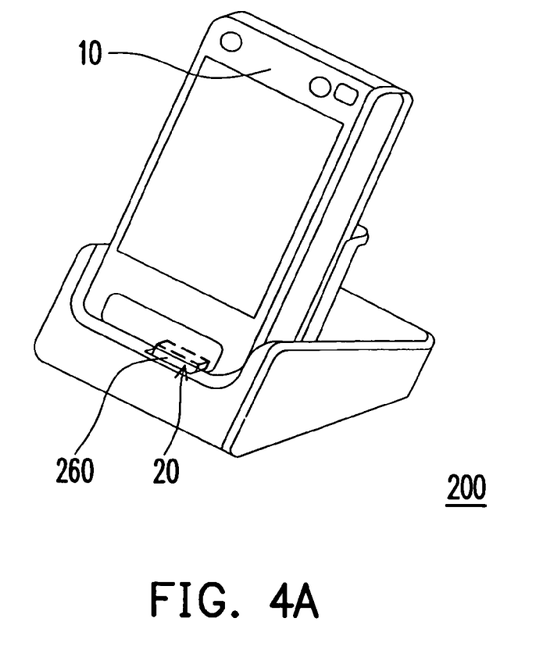
FIGS. 4A, 4B, and 4C respectively illustrate the operations of a recoverable connector structure and a cradle according to an embodiment of the present invention.
Figure 4B:
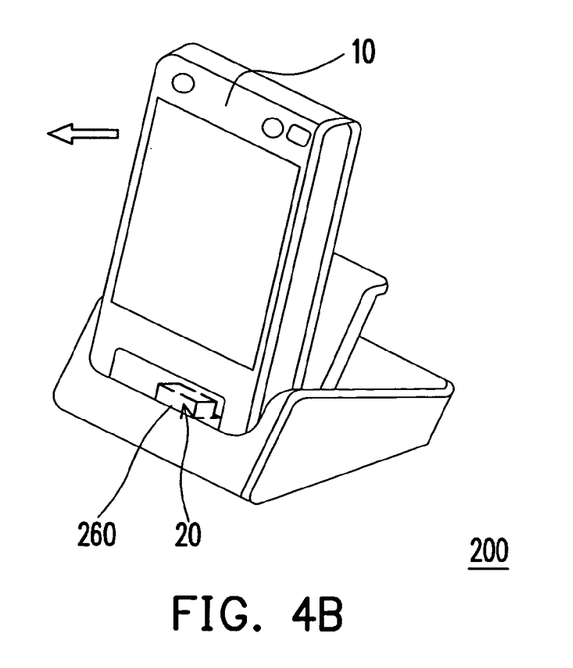
Figure 4C:
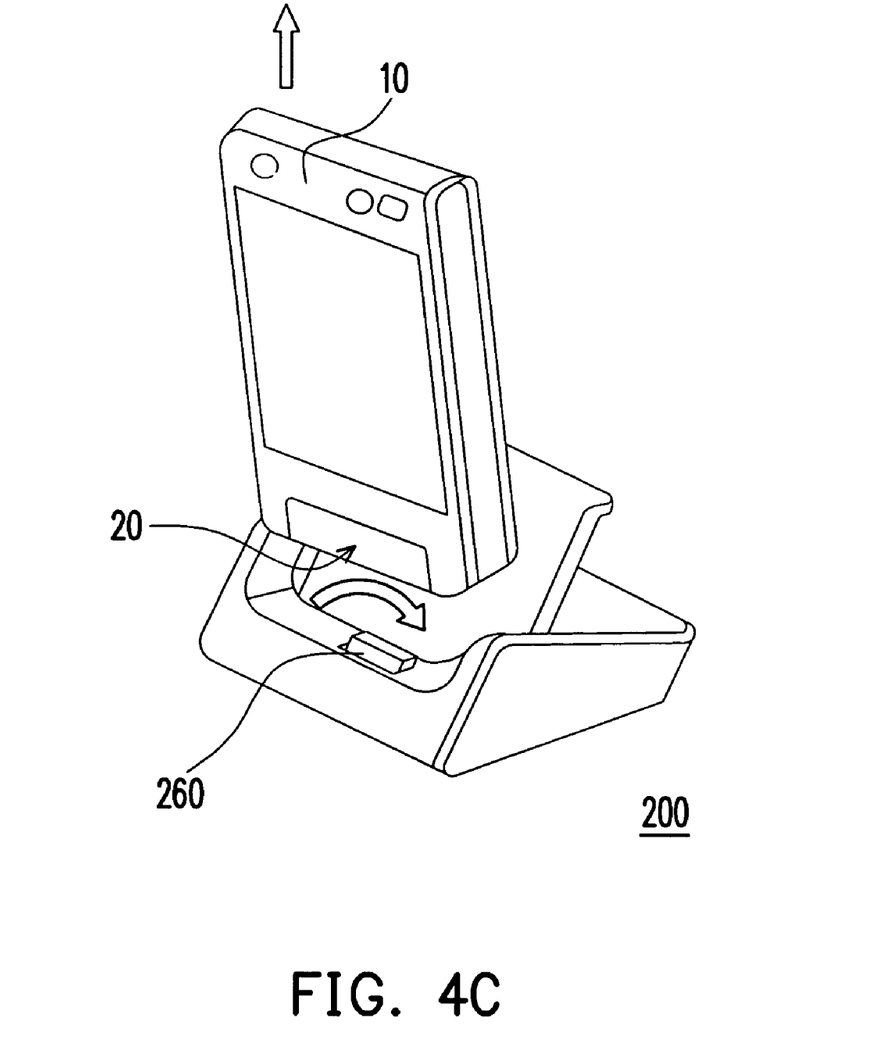

FIGS. 4A, 4B, and 4C respectively illustrate the operations between an electronic device (such as PDA 10) and a recoverable connector structure and a cradle 200 described in the present invention. As shown in FIG. 4A, the PDA 10 is disposed in the cradle 200 with a specific angle, and the first connector 20 of the PDA 10 is coupled with the second connector 260 of the cradle 200 for delivering power or transmitting signal or delivering power and transmitting signal simultaneously. Then, as shown in FIG. 4B, a user can rotate the PDA 10 at a maximum angle (where the maximum angle is determined by the elasticity of the recoverable assembly 250) following the arrow direction. The present invention allows the second connector 260 to rotate along the PDA 10 at a maximum angle until it is smoothly separated from the cradle 200. Finally, as shown in FIG. 4C, after the PDA 10 is fully separated from the second connector 260 of the cradle 200 following the up arrow, the second connector 260 returns to its original position through the recoverable assembly (referring to FIG. 2A) in the cradle 200.

In summary, the recoverable connector structure described in the present invention is suitable for a cradle of the electronic device, such as PDA. The recoverable connector structure mainly comprises a base plate, a fixed stand, a recoverable assembly, a support body, and a shielding plate. Wherein, the recoverable assembly comprises a bolt and an elastic body, and with the combination of the bolt and the elastic body, the second connector can have an elastic range of certain degree for supporting the rotation. Therefore, the recoverable connector assembly and the cradle described in the present invention not only enables a user to pull up the electronic device more smoothly, but also avoids the second connector from fatigued damage due to frequent plugging and unplugging operations to extend the cradle's life.

Although the invention has been described with reference to a particular embodiment thereof, it will be apparent to one of the ordinary skill in the art that modifications to the described embodiment may be made without departing from the spirit of the invention. Accordingly, the scope of the invention will be defined by the attached claims not by the above detailed description.

What is claimed is:

1. A recoverable connector structure for placing in a cradle of an electronic device, wherein the electronic device comprises a first connector, the cradle comprises a second connector and a circuit board, such that the second connector is electrically coupled to the first connector, the circuit board comprises a surface and two holes, and the recoverable connector structure comprises:
   a base plate;
   a fixed stand disposed on the base plate and comprising two lock holes, corresponding to the two holes, respectively;
   a recoverable assembly at least comprising a bolt and an elastic body, wherein the bolt comprises a first end and a second end, the first end passing through one of the holes is correspondingly locked on one of the lock holes, and the elastic body is disposed between the second end and the circuit board such that the elastic body is pushed toward the second end for a certain distance when the circuit board is pushed by an external force; and
   a support body disposed on the circuit board, wherein the bottom of the support body correspondingly contacts the base plate, and the bottom of the support body serves as a pivot point for supporting the second connector to rotate when pushed by an external force, and the second connector is fixed above the support body.

2. The recoverable connector structure of claim 1, wherein the fixed stand and the base plate are formed as an integrative unit.

3. The recoverable connector structure of claim 1, wherein the support body is disposed on the surface between two holes of the circuit board, and the second connector protrudes above the circuit board.

4. The recoverable connector structure of claim 1, wherein the base plate further comprises a block, and the bottom edge of the circuit board contacts the block for forming another pivot point.

5. The recoverable connector structure of claim 1, wherein the fixed stand has a slant surface, and the two lock holes are on the slant surface.

6. The recoverable connector structure of claim 1, wherein the bolt is a screw with a fixed length, the first end of the bolt is a spiral structure, and the second end of the bolt is a protrusion end.

7. The recoverable connector structure of claim 1, wherein the holes on the circuit board are oval holes.

8. The recoverable connector structure of claim 1, wherein the elastic body is a spiral spring.

9. The recoverable connector structure of claim 1, wherein the cradle delivers an external power to the electronic device through the second connector.

10. The recoverable connector structure of claim 1, wherein the cradle transmits an external signal to the electronic device through the second connector.

11. The recoverable connector structure of claim 1, further comprising a shielding plate, wherein the shielding plate covers the support body and the second connector and is soldered on the circuit board.

12. The recoverable connector structure of claim 11, wherein the shielding plate is an anti-EMW interference metal plate.

13. The recoverable connector structure of claim 1, wherein the base plate comprises two blocks, and the bottom of the support body comprises two contact faces that correspondingly contact the two blocks respectively for forming the pivot point.

14. The recoverable connector structure of claim 13, wherein the support body is shaped like U, and two surfaces on the opening end of the U-shaped body are the two contact faces.

15. A cradle having a recoverable connector structure for electrically coupling to an electronic device, wherein the electronic device comprises a first connector, and the cradle having the recoverable connector structure comprises:
   a case having a groove for placing the electronic device;
   a base plate connected to the bottom of the case;
   a fixed stand disposed on the base plate and having two lock holes;
   a circuit board recoverably disposed on the fixed stand, wherein the circuit board comprises a surface and two holes, and each hole corresponds to a position of each lock hole;
   a recoverable assembly at least comprising a bolt and an elastic body, wherein the bolt comprises a first end and a second end, the first end passing through one of the holes is correspondingly locked on one of the lock holes, and the elastic body is disposed between the second end and the circuit board such that the elastic body is pushed toward the second end for a certain distance when the circuit board is pushed by an external force;
   a second connector electrically coupled with the circuit board, and the second connector protruding from the groove; and
   a support body disposed on the circuit board, wherein the bottom of the support body correspondingly contacts the base plate, and the bottom of the support body works as a pivot point for supporting the second connector to rotate when pushed by the external force, and the second connector is fixed above the support body.

16. The cradle having the recoverable connector structure of claim 15, wherein the fixed stand and the base plate are formed as an integrative unit.

17. The cradle having the recoverable connector structure of claim 15, wherein the support body is disposed on the surface between two holes of the circuit board, and the second connector protrudes above the circuit board.

18. The cradle having the recoverable connector structure of claim 15, wherein the base plate comprises two blocks, and the bottom of the support body comprises two contact faces that correspondingly contact the two blocks respectively for forming the pivot point.

19. The cradle having the recoverable connector structure of claim 15, wherein the support body is shaped like U, and two surfaces on the opening end of the U-shaped body are the two contact faces.

20. The cradle having the recoverable connector structure of claim 15, wherein the base plate further comprises a block, and the bottom of the circuit board contacts the block for forming another pivot point.

21. The cradle having the recoverable connector structure of claim 15, wherein the fixed stand has a slant surface, and the two lock holes are on the slant surface.

22. The cradle having the recoverable connector structure of claim 15, wherein the bolt is a screw with fixed length, the first end of the bolt is a spiral structure, and the second end of the bolt is a protrusion end.

23. The cradle having the recoverable connector structure of claim 15, wherein the holes on the circuit board are oval holes.

24. The cradle having the recoverable connector structure of claim 15, wherein the elastic body is a spiral spring.

25. The cradle having the recoverable connector structure of claim 15, wherein the cradle delivers an external power to the electronic device through the second connector.

26. The cradle having the recoverable connector structure of claim 15, wherein the second connector transmits an external signal to the electronic device.

27. The cradle having the recoverable connector structure of claim 15, further comprising a shielding plate, wherein the shielding plate covers the support body and the second connector and is soldered on the circuit board.

28. The cradle having the recoverable connector structure of claim 17, wherein the shielding plate is an anti-EMW interference metal plate.

* * * * *